United States Patent Office.

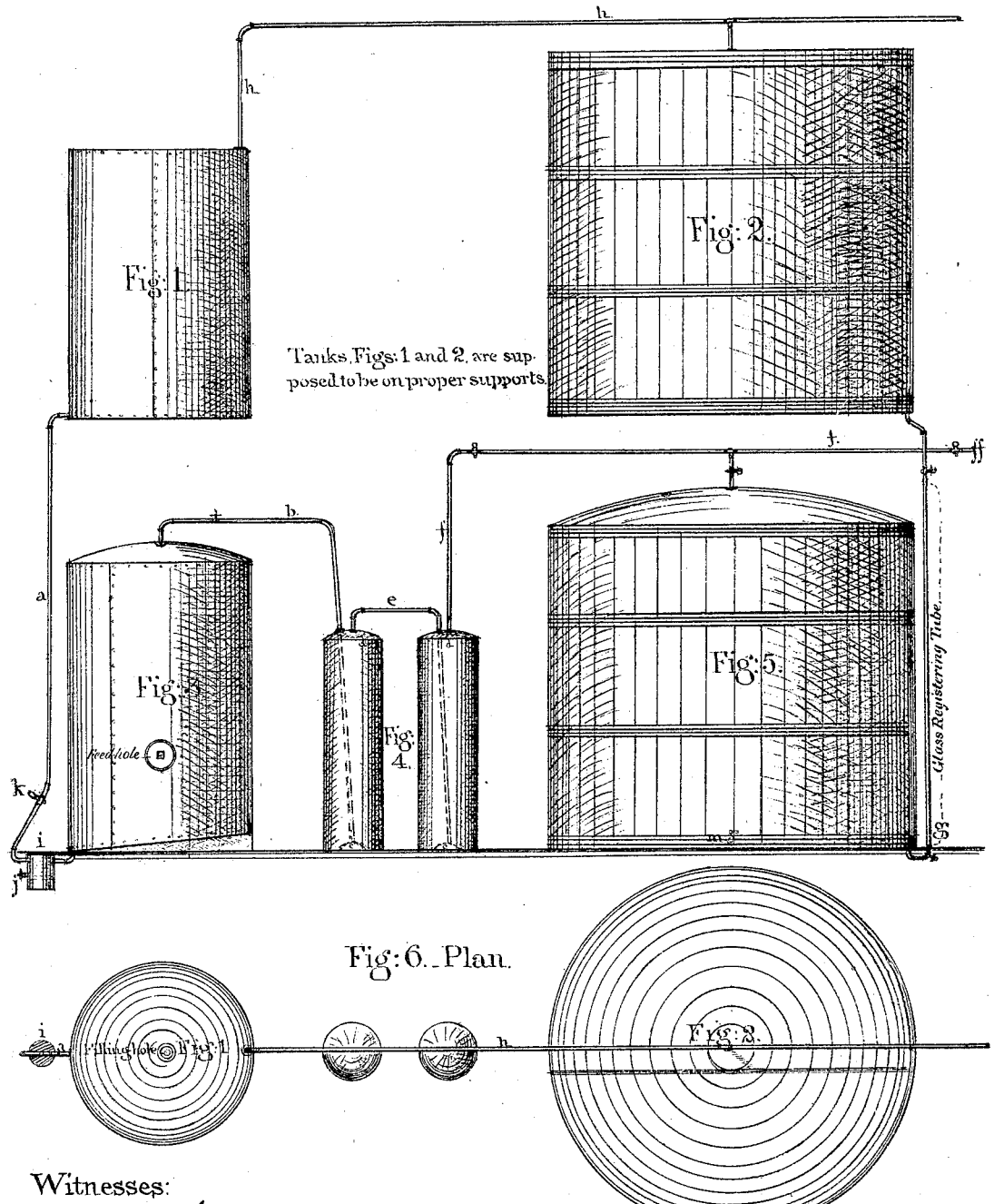

SAMUEL HEVNER, OF SAN FRANCISCO, CALIFORNIA.

Letters Patent No. 114,559, dated May 9, 1871.

IMPROVEMENT IN MANUFACTURE OF ILLUMINATING-GAS.

The Schedule referred to in these Letters Patent and making part of the same.

I, SAMUEL HEVNER, of the city of San Francisco and State of California, have invented certain Improvements in the Manufacture of Illuminating-Gas, of which the following is a specification.

The acids which are to act upon the solids, &c., in the process of generating the gas are contained in tank, Figure 1, and the solids, &c., in the tank below, Figure 3, the connection being the tube $a$.

The similar tanks, Figure 4, are to contain etherealized liquids.

Figure 5 represents the gas-reservoir, tank, or gasometer; and

Figure 2 is a water-reservoir or tank.

By the pressure of the gas generated in the tank, fig. 3, the aqueous acids are expelled and the gas, when let on, passes through the tube $b$ into a strainer, $c$, at bottom of the small tank; then rises through the carbonating materials through a strainer at head, $d$, and tube $e$; descends, as in the first tank, through the second one, similar in all respects, and rising in the tube $ff$, and descends into the gasometer, reservoir, or tank, fig. 5, displacing the water contained therein, driving it up, by the tube $g$, into the reservoir or tank above, fig. 2.

The metal tube $g$ contains within it a glass tube, as indicated upon the drawing, which is a registering-meter to exhibit at all times the cubic feet of gas which have passed off from the gasometer or tank-supply pipe or tube $ff$ for the consumers of gas.

Pipe or tube $h$, from the acid-tank, connects, as shown in the drawing, with the water-tank, but continues horizontally into a flue, or otherwise, to discharge odor and to receive atmospheric air.

Tank fig. 3 has an oblique bottom, in order that the pressure of the gas above will force the acid down to the lower part and into the cess-pool $i$, which has a discharge-cock, $j$.

The cock $k$ on tube $a$ is for the introduction of acids when required.

*Description of the Accompanying Drawing.*

Fig. 1, a lead acid-tank.
Fig. 2, wood water-tank or reservoir.
Fig. 3, tinned-copper generating-tank.
Fig. 4, tinned-copper gasoline-tanks.
Fig. 5, wood gas-reservoir, tank, or gasometer.
$a$, acid-tube.
$b$ $e$ $f$, gas-tubes.
$g$, gas-tube and register.
$h$, air and odor pipe or tube.
$i$, cess-pool.
$j$, discharge-cock.
$k$, cock for the introduction of acids from figs. 1 to 3.
Figure 6, a plan of the apparatus.

What I claim as my invention is—

1. The combination of the closed gasometer 5 with the hydrogen-generator and carbureter, as and for the purpose set forth.

2. The combination of the acid-reservoir 1, escape-pipe $h$, and the water-reservoir 2, substantially as described, and for the purpose set forth.

3. The combination of the carbureter 4, supply-pipe $f$, gasometer 5, register-tube $g$, and water-reservoir 2, as and for the purpose set forth.

SAMUEL HEVNER.

Witnesses:
ALONZO HUGHES,
J. C. WILDMAN.